US012624639B2

(12) United States Patent
Piatek et al.

(10) Patent No.: US 12,624,639 B2
(45) Date of Patent: May 12, 2026

(54) TURBINE MODULE FOR A TURBOMACHINE

(71) Applicant: MTU Aero Engines AG, Munich (DE)

(72) Inventors: Michal Piatek, Krasne (PL); Roman Seiband, Todtenweis (DE); Hermann Klingels, Dachau (DE); Kacper Palkus, Tarnobrzeg (PL); Christian Pfalzgraf, Munich (DE)

(73) Assignee: MTU Aero Engines AG, Munich (DE)

( * ) Notice: Subject to any disclaimer, the term of this patent is extended or adjusted under 35 U.S.C. 154(b) by 0 days.

(21) Appl. No.: 19/275,204

(22) Filed: Jul. 21, 2025

(65) Prior Publication Data

US 2026/0028914 A1 Jan. 29, 2026

(30) Foreign Application Priority Data

Jul. 26, 2024 (EP) ..................................... 24191164

(51) Int. Cl.
*F01D 9/04* (2006.01)

(52) U.S. Cl.
CPC .......... *F01D 9/041* (2013.01); *F05D 2240/12* (2013.01); *F05D 2260/606* (2013.01)

(58) Field of Classification Search
None
See application file for complete search history.

(56) References Cited

U.S. PATENT DOCUMENTS

| | | | |
|---|---|---|---|
| 4,025,226 A | 5/1977 | Hovan | |
| 4,146,352 A | 3/1979 | Yasugahira et al. | |
| 4,752,185 A | 6/1988 | Butler et al. | |
| 10,378,372 B2 | 8/2019 | Negulescu et al. | |
| 10,526,906 B2 | 1/2020 | Nguyen et al. | |
| 11,118,474 B2 * | 9/2021 | Propheter-Hinckley | F01D 5/187 |
| 11,466,578 B2 * | 10/2022 | Pintat | F01D 5/145 |
| 11,473,435 B2 | 10/2022 | Pintat et al. | |
| 12,123,312 B2 | 10/2024 | Palkus | |
| 2007/0110563 A1 | 5/2007 | Janke et al. | |
| 2012/0128472 A1 | 5/2012 | Singh et al. | |
| 2016/0208631 A1 | 7/2016 | Spangler | |
| 2016/0312654 A1 | 10/2016 | Chakka et al. | |

(Continued)

FOREIGN PATENT DOCUMENTS

| | | |
|---|---|---|
| EP | 3121371 A1 | 1/2017 |
| EP | 3121371 B1 | 10/2020 |

(Continued)

*Primary Examiner* — Courtney D Heinle
*Assistant Examiner* — Danielle M. Christensen
(74) *Attorney, Agent, or Firm* — Hinckley, Allen & Snyder, LLP; David R. Josephs

(57) ABSTRACT

The application relates to a turbine module for a turbomachine, the turbine module comprising: a main channel to guide a main flow through the turbine module; a stator vane comprising a stator airfoil and an outer platform; a cavity extending at least partly radially outside of the stator airfoil; the cavity comprising an inlet opening for guiding a part of the main flow into the cavity and an outlet for a reinjection of the part of the main flow from the cavity into the main channel, wherein an inner wall of the outer platform defines the main channel radially, and wherein the inlet opening is arranged on a radial position radially outside of the inner wall of the outer platform.

19 Claims, 4 Drawing Sheets

(56) References Cited

U.S. PATENT DOCUMENTS

| | | | |
|---|---|---|---|
| 2017/0022836 A1 | 1/2017 | Negulescu et al. | |
| 2017/0362941 A1 | 12/2017 | Craig, III | |
| 2018/0058230 A1 | 3/2018 | Propheter-Hinckley et al. | |
| 2018/0291763 A1 | 10/2018 | Pitt | |
| 2019/0107006 A1 | 4/2019 | Propheter-Hinckley et al. | |
| 2019/0331000 A1 | 10/2019 | Klingels | |
| 2020/0190995 A1 | 6/2020 | Perron et al. | |
| 2023/0029124 A1* | 1/2023 | Palkus | F01D 11/14 |

FOREIGN PATENT DOCUMENTS

| | | | |
|---|---|---|---|
| EP | 3561228 | B1 | 7/2021 |
| EP | 3561236 | B1 | 11/2022 |
| EP | 4123124 | A1 | 1/2023 |
| FR | 3107298 | B1 | 2/2022 |
| KR | 102153065 | B1 | 9/2020 |

* cited by examiner

TURBINE MODULE FOR A TURBOMACHINE

BACKGROUND OF THE INVENTION

The present application relates to a turbine module for a turbomachine.

Turbomachines can be used in jet engines, e.g. turbofan engines. Functionally, the turbomachine may be divided into a compressor, a combustion chamber and a turbine. In the case of the jet engine, for example, air that is sucked in is compressed by the compressor and burned with added fuel, e.g. kerosene, in the combustion chamber located downstream. The resulting hot gas, a mixture of combustion gas and air, flows through the turbine located downstream and is expanded in this process. The turbine extracts energy from the hot gas to drive the compressor, for instance.

This shall illustrate a typical application, alternatively the turbine module can for instance be used in a stationary gas turbine.

SUMMARY OF THE INVENTION

Examples of the present application are direct at an advantageous turbine module.

In the embodiment of the present invention, the turbine module comprises a main channel, a stator vane with a stator airfoil and a cavity, which extends at least partly radially outside of the stator airfoil. The cavity comprises an inlet opening, through which a part of a main flow in the main channel may be extracted from the main channel into the cavity. Further, it comprises an outlet, through which the part of the main flow extracted from the main channel and guided through the cavity is reinjected to the main channel in operation.

In addition to the stator airfoil, the stator vane comprises an outer platform arranged radially outside of the stator airfoil. An inner wall of the outer platform defines the main channel radially, i.e. radially outwards. In the embodiment of claim 1, the inlet opening of the cavity is arranged on a radial position radially outside of the inner wall of the outer platform. Arranging the inlet opening not in the inner wall of the outer platform, but radially outside, can for instance have fluidical or structural-mechanical advantages, e.g. reduce an influence on the main flow or an impact on the structural integrity of the outer platform.

Generally, the main flow through the main channel, i.e. hot gas flow, can possess flow regions of higher losses due to the presence of secondary flows, for example due to tip clearance losses of a rotating rotor blade in a rotor passage. Flow disturbances starting in the rotor passage can propagate in a stator passage downstream and disturb the inlet flow of a stator vane. An approach of the present application is to bleed a part of the main flow, e.g. from a flow region of higher losses, away into the cavity and reinject this flow back into the main channel at a downstream location. In simple words, at least a portion of the airfoil of the downstream stator vane is bypassed, e.g. at least its leading edge.

As discussed in further detail below, e.g. a leakage flow of a rotor passage arranged upstream of the stator vane may be extracted from the main channel through the inlet opening into the cavity, e.g. a tip leakage flow going over the tip of the rotor blade. Such a tip leakage flow may be reduced by a so-called outer air seal of the rotor passage, e.g. shrouded blades in combination with a labyrinth seal at the casing, nonetheless a certain tip leakage may remain. In comparison to the main flow, the leakage flow can for instance have a different angle, because the main flow is reoriented when passing the rotor passage. Independently of these details, the tip leakage flow, or in more general words, any disturbed or misoriented flow portion, can be extracted to bypass at least the leading edge of the stator airfoil.

In general, a reinjection of the bypassed part of the main flow may occur at any downstream position, e.g. at another stator vane following downstream (bypassing also a rotor passage in between). Alternatively, at least some of the bypassed flow or the entire bypassed flow may be reinjected within the stator vane, e.g. behind the trailing edge but still in front of a rear end of the outer platform or at an axial position within the stator airfoil, see in detail below. Independently of these details, the reinjection may be adapted to and/or used for influencing the flow characteristics of the main flow, e.g. to energize a boundary layer and for example prevent a flow separation, or to improve the circumferential mixing of the secondary flows and mitigate a passage vortex, for example, in the stator passage.

Further embodiments can be found in the dependent claims and in the entire disclosure, wherein in the description of the features, a distinction is not always made in detail between device and method or use aspects; the disclosure is to be read implicitly with regard to all claim categories. If, for example, an advantage of the module is described in a specific application, this is to be understood at the same time as a disclosure of a corresponding use.

For bypassing the stator airfoil, i.e. at least the leading edge thereof, the cavity is arranged radially outside of the stator airfoil, wherein the radial relative positions of the stator airfoil and the cavity are respectively compared at a same axial position. Since the main channel may radially widen in an axial downstream direction, the stator airfoil can, for instance, extend further radially outwards at its trailing edge than at its leading edge, so that a radially outer end of the trailing edge may be arranged on a radial position further outwards compared to a radial position of the cavity at an axial position of the leading edge. Therefore, the radial relative positioning respectively relates to the same axial position.

The cavity extending "at least partly" radially outside of the stator airfoil means that at least a portion of the cavity is arranged radially outside thereof. Additionally, the cavity may for instance have a portion arranged at an axial position upstream of the leading edge, i.e. not arranged at the same axial position as the stator airfoil. Further, the cavity does not necessarily extend axially over the entire stator airfoil, the outlet/outlet opening can also be arranged upstream of the trailing edge of the stator airfoil, see the exemplary embodiments for illustration.

Generally, "axially", "radially" and "circumferentially", as well as the respective directions (axial direction and so on), refer to a longitudinal axis of the turbine module, which may coincide with a longitudinal axis of the turbomachine and/or rotational axis of a rotor passage or rotor blade of the turbine module. "Inner" and "outer" may refer to the radial direction, "outside of" meaning for instance at a larger radial distance from the longitudinal axis (vice versa, "inside of" means closer thereto). For example, the outer platform is arranged radially outside of the stator airfoil, the inner wall of the outer platform being arranged radially inside of an outer wall of the outer platform (at a respective axial position).

In an embodiment, the inlet opening is arranged in an axial front face of the outer platform. The axial front face is oriented axially, i.e. towards upstream components or parts (e.g. an upstream rotor passage, see in detail below). A surface normal on the axial front face may lie basically parallel to the axial direction, e.g. with a tilt of no more than 15°, 10° or 5°, e.g. as viewed in an axial cross-section. The axial front face extends between the inner and the outer wall of the outer platform. Arranging the inlet opening in the axial front face can for instance be advantageous in view of a reduced impact on the inner wall (flow characteristics in the main channel) and/or in view of the structural integrity.

As viewed in the axial cross-section, the front face can be realized as an overall flat surface. Alternatively, a groove may be arranged in the front face, for instance a groove having its length extension in the circumferential direction, e.g. over the whole circumferential range. The groove introduction may allow to reduce the mass and improve structure mechanical conditions. As viewed in the axial cross-section, the inlet opening or openings may be in the groove, for instance at the bottom of the groove. In other words, the shape of the inlet opening(s) may be adjusted to the groove geometry. Radially inside and/or radially outside of the groove as viewed in the axial cross-section, a surface normal on the front face may lie basically parallel to the axial direction, see the paragraph above.

In an embodiment, the outer platform comprises a front vane hook, via which the stator vane can be mounted at a housing structure. As viewed in an axial cross-section, the sectional plane containing the longitudinal axis, the front vane hook may have a radially outwardly protruding portion (e.g. obliquely with an additional axial extension) and an axially protruding portion that can be hooked in the housing structure. In an embodiment, the cavity extends radially inside of the front vane hook and keeps the functionality of the front vane hook; in other words, it leaves the front vane hook uninterrupted, e.g. does not intersect any portion of it.

In an embodiment, the cavity comprises a plurality of inlet openings, i.e. n inlet openings with $n \geq 2$. Therein, all inlet openings of the cavity may respectively be arranged on a radial position radially outside of the inner wall of the outer platform, e.g. respectively in the axial front face. The outlet may comprise a plurality of outlet openings or one single outlet opening, $m \geq 1$, wherein the number of inlet openings may be larger than the number of outlet openings, $n \geq m$. Providing a plurality of inlet openings, e.g. instead of one single large inlet opening, can for instance have structural mechanical advantages, e.g. since the inlet openings are arranged axially close to or on the same position like the front vane hook. In an embodiment, the number n of inlet openings is twice the number m of outlet openings, $n=2m$.

In an embodiment, circumferentially adjacent inlet openings, in particular in the stator vane, are separated by a rib 52.

In an embodiment, the cavity extends as a closed channel between the inlet opening or openings and the outlet opening or openings. In other words, the cavity is a continuous channel, e.g. without a fluidical communication with the housing. By way of example, all openings of the channel may be provided in the axial front face and in the inner wall of the outer platform, the channel/cavity having for instance no openings in addition thereto.

In an embodiment, the closed channel is defined within the outer platform. In other words, the closed channel as viewed in a vertical cross-section is arranged radially between the inner wall and the outer wall of the other platform.

In an embodiment, independently of whether the cavity has one single or a plurality of outlet openings, all outlet openings of the cavity are arranged in the inner wall of the outer platform. In other words, the cavity has its outlet opening(s) nowhere else than in the inner wall of the outer platform. By way of example, the cavity may comprise one single outlet opening arranged in the inner wall.

In an embodiment, the stator vane belongs to a stator segment. Circumferentially, a plurality of stator segments can be assembled, forming together a stator passage. Independently of these details, the stator segment may comprise one single or a plurality of stator airfoils. In an embodiment, the cavity is circumferentially defined within the stator segment.

In an embodiment, the circumferential extension of the cavity is limited to an area or space between two neighboring airfoils, e.g. does not circumferentially overlap with a stator airfoil (as viewed in a direction radially inwards). In other words, the cavity is arranged circumferentially between but without a circumferential overlap to the stator airfoils. This can for instance reduce a structural weakening of the outer platform at a mechanically loaded location.

In the stator segment, exactly one cavity or a plurality of cavities can be provided, the plurality of cavities arranged for instance with a circumferential offset to each other. In an embodiment, the plurality of cavities are, apart from their respective fluid communication with the main channel, fluidically isolated from each other (e.g. no circumferential passage or the like).

Upstream of the stator vane, the turbine module may comprise a rotor blade. In an embodiment, the part of the main flow guided into the cavity is a leakage flow of the rotor blade, e.g. a tip-leakage flow over the blade shroud. The leakage flow can result in a tip vortex flow and can further develop in the main channel downstream. It can for instance disturb the main flow and interact with a passage vortex in the stator passage, decreasing the efficiency.

In an embodiment, a turbomachine having a turbine module disclosed here is provided. The turbomachine may for instance be a jet engine, e.g. turbofan engine.

In an embodiment, a use or method of using a turbomachine comprises guiding a part of the main flow through the inlet opening into the cavity and reinjecting it from the cavity into the main channel downstream.

BRIEF DESCRIPTION OF THE DRAWINGS FIGURES

The invention is explained in more detail below using an exemplary embodiment, wherein the individual features may also be provided in other combinations and the description relates to all claim categories. The figures show the following views.

DESCRIPTION OF THE INVENTION

Figure 1:
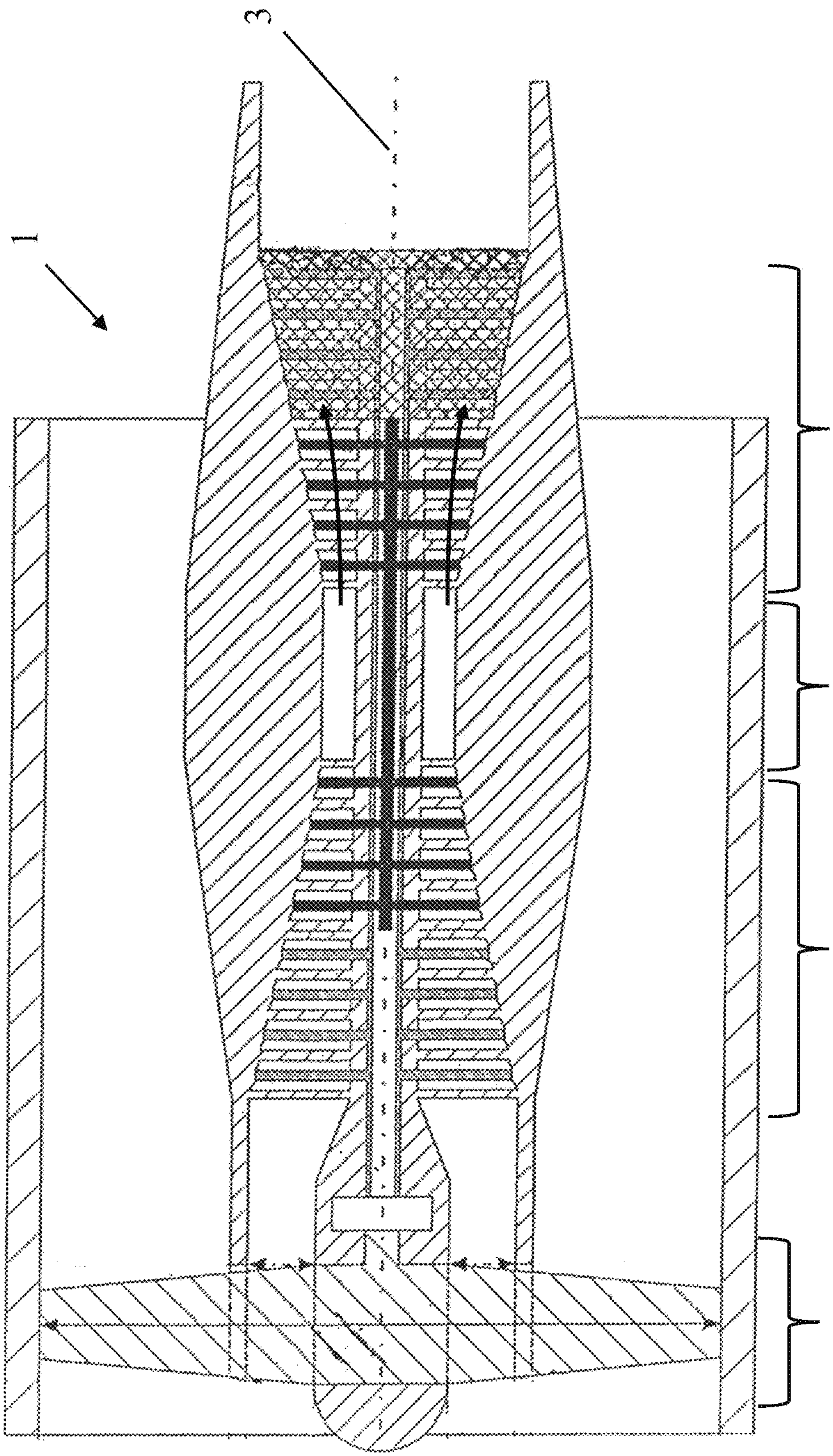
FIG. 1 shows a jet engine in an axial cross-section.

FIG. 1 shows a turbomachine 1, specifically a turbofan engine, in an axial section. The turbomachine 1 is functionally divided into a compressor 1*a*, a combustion chamber 1*b*, a turbine 1*c* and a fan 1*d*. Both the compressor 1*a* and the turbine 1*c* are each made up of several stages, each stage comprising a stator vane ring and a rotor blade ring. During operation, the rotor blade rings rotate around the longitudinal axis 3 of the turbomachine 1, and air sucked in is compressed in the compressor 1*a* and then burned with fuel in the combustion chamber 1*b*. The resulting hot gas is expanded in the turbine 1*c* and drives the rotor blade rings.

Figure 2:
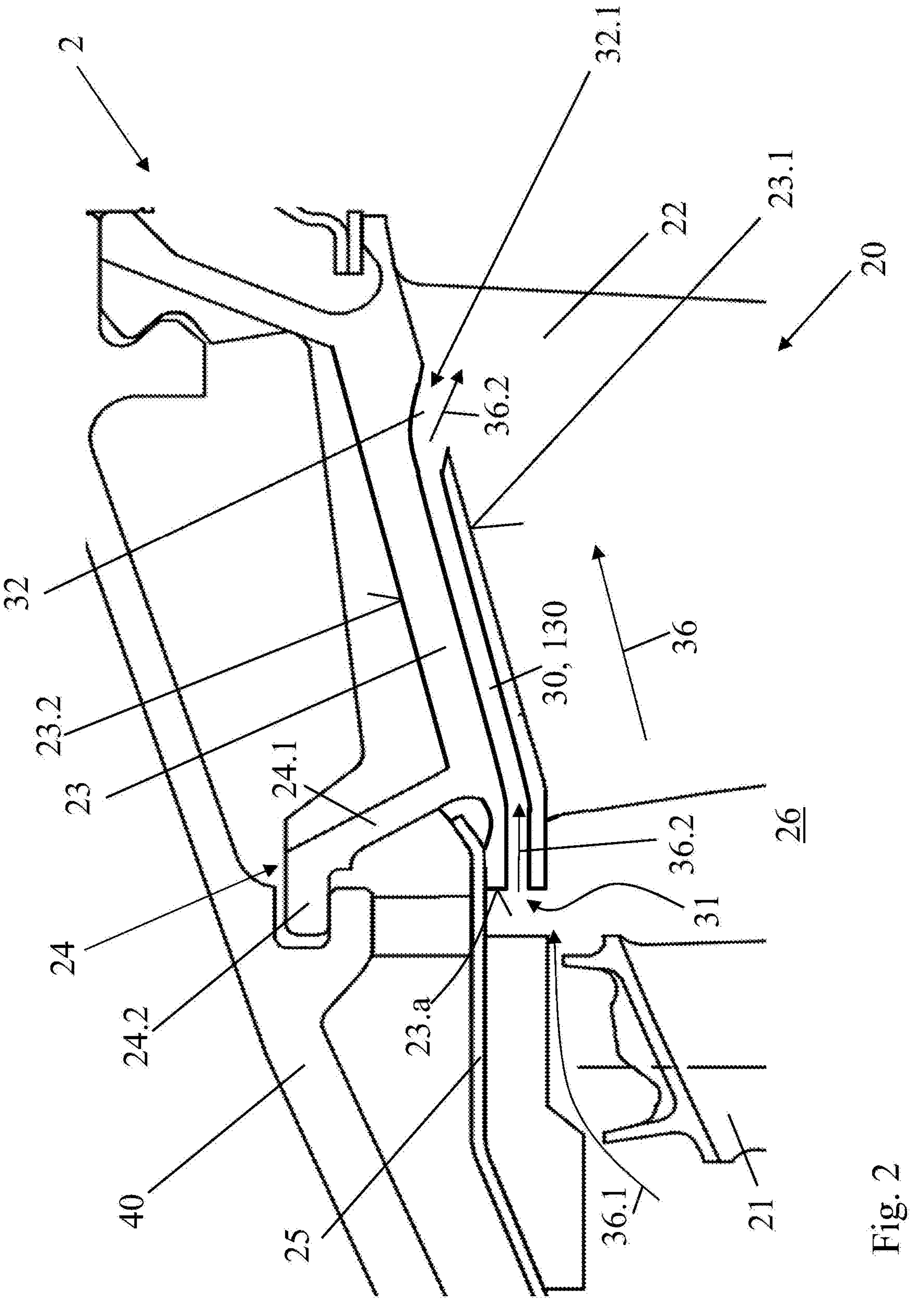
FIG. 2 shows a schematic representation of a turbine module.

FIG. 2 shows a turbine module 2 of the turbine 1*c* in schematic representation. A main flow 36 is guided through a main channel 26 of the turbine module 2. In the main channel 26, a stator airfoil 22 is arranged downstream of a rotor blade 21. An inner wall 25 of the engine casing can also be seen, radially delimiting the rotor passage of the main channel 26 to the outside. The stator airfoil 22 belongs to a stator vane 20, which additionally comprises an outer platform 23.

Radially outside of the stator airfoil 22, a cavity 30 is arranged. It comprises an inlet opening 31 arranged axially upstream of the stator airfoil 22. Through the inlet opening 31, a part 36.2 of the main flow 36 can be extracted from the main channel 26 into the cavity 30. Via an outlet 32 with an outlet opening 32.1, the part 36.2 of the main flow 36 is reinjected to the main channel 26 subsequently. In the example shown, the outlet opening 32.1 is arranged in an inner wall 23.1 of the outer platform 23, e.g. at an axial position between 50% to 90% of an axial cord length of the stator airfoil 22.

The inlet opening 31 is arranged on a radial position radially outside of the inner wall 23.1 of the outer platform 23, i.e. in an axial front face 23.*a* of the outer platform 23. Apart from the inlet and outlet openings 31, 32.1, the cavity 30 extends as a closed channel 130, it is radially defined within the inner wall 23.1 and the outer wall 23.2 of the outer platform 23.

At the outer platform 23, a front vane hook 24 is arranged, via which the stator vane 20 is mounted at a housing structure 40. The front vane hook 24 comprises a radially protruding portion 24.1 and an axially protruding portion 24.2, wherein the inlet opening 31 and the cavity 30 leave each of these portions 24.1, 24.2 uninterrupted.

The rotating rotor blade 21 creates a tip-leakage flow 36.1, which could disturb the flow, see in detail above. To prevent such secondary flows, the part 36.2 of the main flow 36 guided through the inlet 31 into the cavity 30 is the tip-leakage flow 36.1. Subsequently, it is reinjected via the outlet 32 into the main channel 26.

Figure 3:
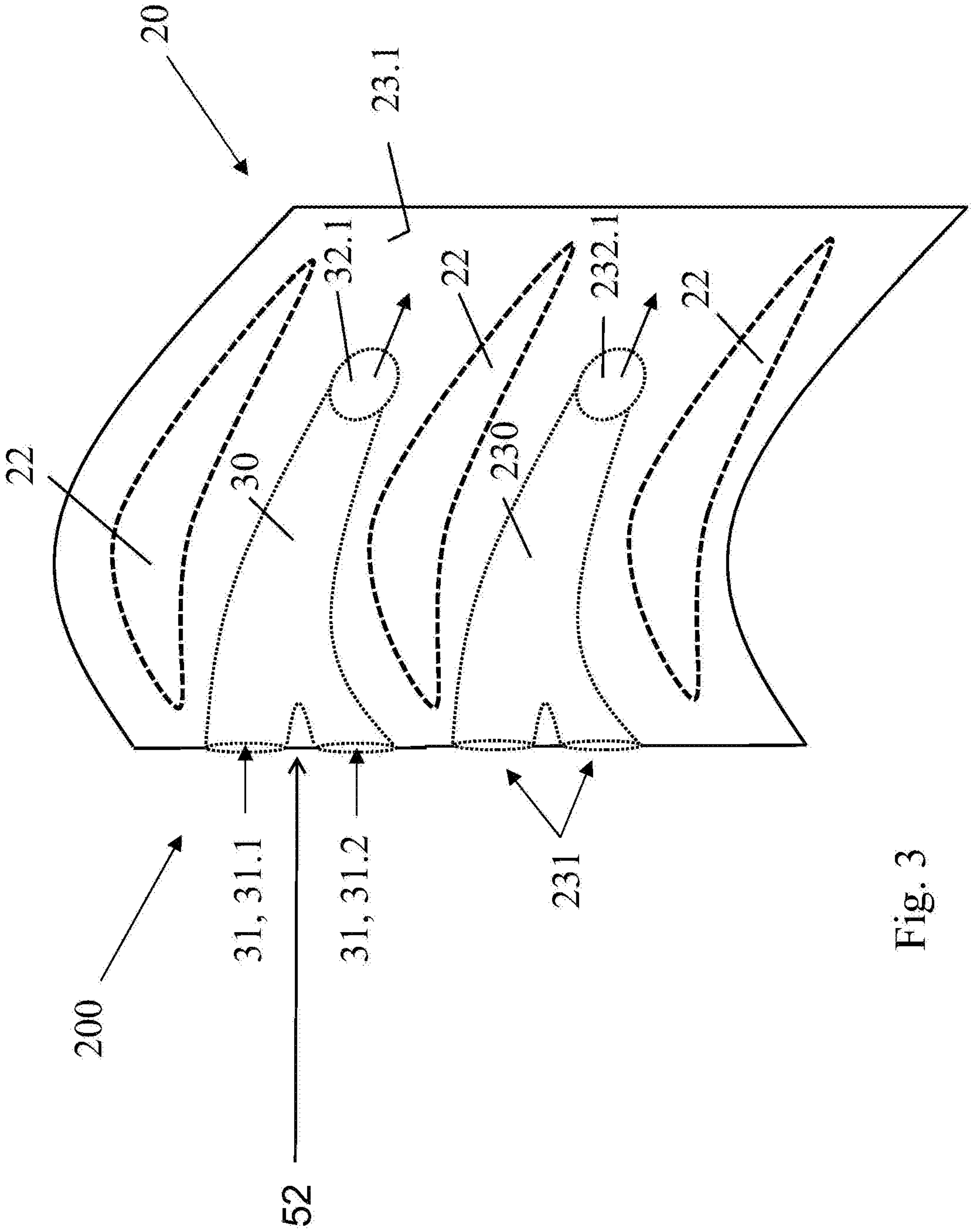
FIG. 3 shows a schematic representation of a stator segment of the turbine module in a radial view.

FIG. 3 shows a stator segment 200 with the stator vane 20 in a schematic radial view. In the example shown, the stator segment 200 comprises three stator airfoils 22 (other numbers being possible, of course). The cavity 30 is indicated schematically, in the example shown it comprises two inlet openings 31, namely a first inlet opening 31.1 and a second inlet opening 31.2. The number of outlet openings 32.1 is smaller, e.g. exactly one outlet opening 32.1 being provided in this example.

The first inlet opening 31.1 and the second inlet opening 31.2 are separated by a rib.

In addition to the cavity 30, the stator segment 200 shown comprises a further cavity 230. It has a further inlet opening 231 and a further outlet opening 232.1. Apart from that, e.g. apart from that communication via the main channel 26, the cavities 30, 230 are fluidically isolated from each other.

Figure 4:
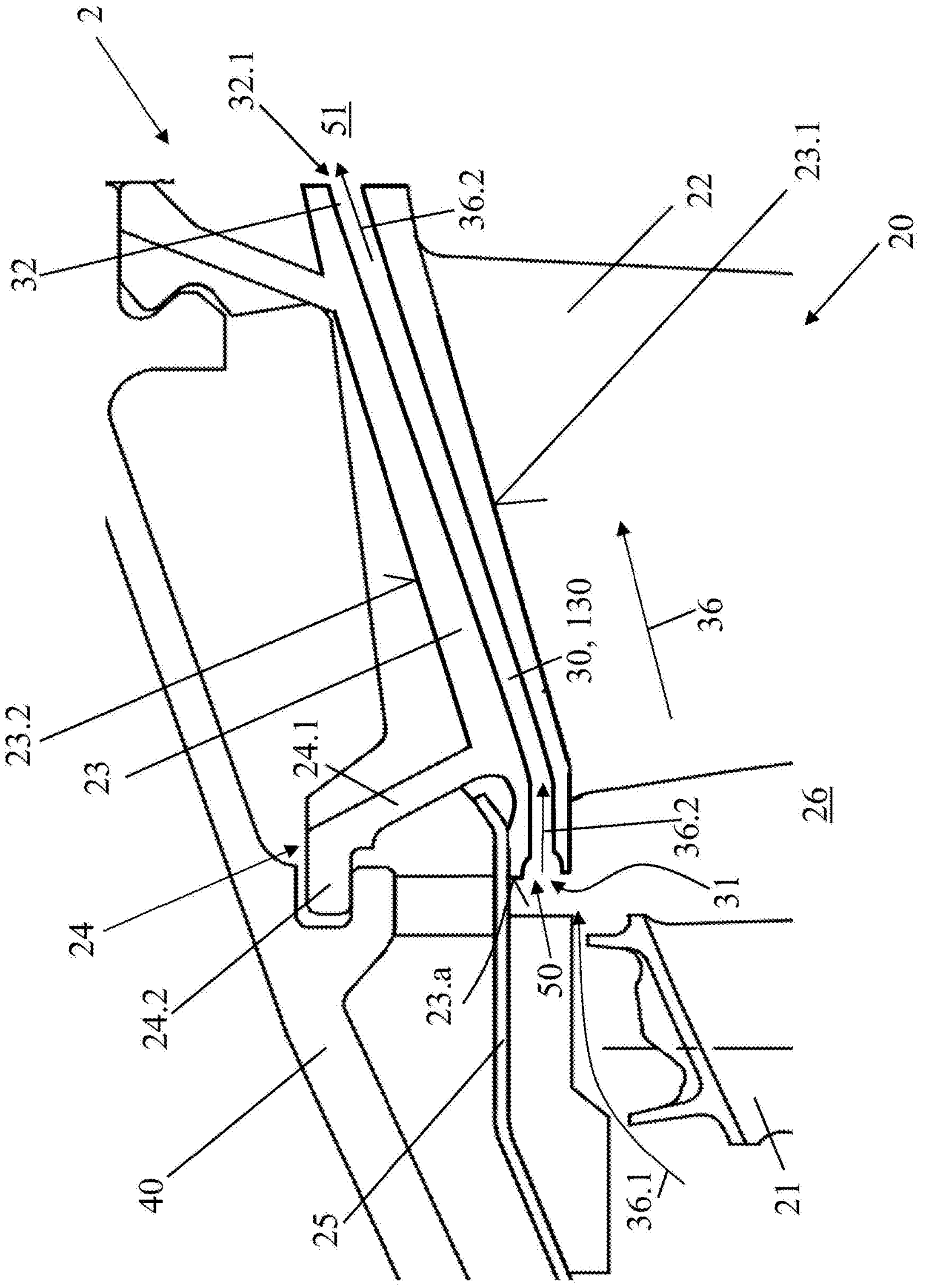
FIG. 4 shows a schematic representation of a further embodiment of a turbine module.

FIG. 4 shows a further embodiment of a turbine module 2 of the turbine 1*c* in a schematic representation. Generally in this disclosure, the like reference numerals indicate the like elements or elements having the like function and reference is made to the description of the respectively other figures as well. The following description highlights mainly the differences compared to the embodiment of FIG. 2. The inlet opening 31 is again provided in the axial front face 23.*a* of the outer platform 23. In the example shown here, the axial front face 23.*a* comprises a groove 50 which has its length extension in the circumferential direction (perpendicular to the drawing plane). The inlet opening 31 is adapted to the shape of the groove 50, i.e. arranged at the bottom of the groove 50.

The part 36.2 of the main flow 36, which is extracted from the main channel 26 into the cavity 30, is passed through the cavity 30 to the outlet 32 and exits via the outlet opening 32.1. In the example shown, it is guided into the outer air seal cavity 51 of the next rotating blade (not shown here). This can be an alternative to an outlet opening arranged in the inner wall 23.1, as shown in FIG. 2, or be provided in combination therewith, i.e. the outlet 32 comprising outlet openings into the downstream outer air seal cavity 51 and into the inner wall 23.1.

What is claimed is:

1. A turbine module for a turbomachine, the turbine module comprising:

a main channel to guide a main flow through the turbine module;

a stator vane comprising a stator airfoil and an outer platform; the outer platform having an inner wall surface and an outer wall surface;

a cavity extending at least partly radially outside of the stator airfoil;

the cavity comprising an inlet opening for guiding a part of the main flow into the cavity and an outlet for a reinjection of the part of the main flow from the cavity (30) into the main channel, wherein an inner wall of the outer platform defines the main channel radially, and wherein the inlet opening is arranged on a radial position radially outside of the inner wall surface of the outer platform and radially inside of the outer wall surface of the outer platform.

2. The turbine module according to claim 1, wherein the inlet opening is arranged in an axial front face of the outer platform.

3. The turbine module according to claim 1, wherein the outer platform comprises a front vane hook, wherein the cavity extends radially inside of the front vane hook and keeps the functionality of the front vane hook.

4. The turbine module according to claim 1, wherein the cavity comprises a number n of inlet openings, where $n \geq 2$, and a number m of outlet openings, where $m \geq 1$, wherein circumferentially adjacent inlet openings are separated by ribs.

5. The turbine module according to claim 4, wherein the number n of inlet openings is twice the number m of outlet openings, $n=2m$.

6. The turbine module according to claim 1, wherein the cavity extends as a closed channel between the inlet opening or openings and the outlet opening or openings.

7. The turbine module according to claim 6, wherein the closed channel is defined within the outer platform.

8. The turbine module according to claim 1, wherein all outlet openings of the cavity are arranged in the inner wall of the outer platform.

9. The turbine module according to claim 1, further comprising:

a rotor blade downstream of the stator vane;

wherein at least one outlet opening of the cavity is arranged in an outer air seal cavity of the rotor blade downstream of the stator vane.

10. The turbine module according to claim 1, the stator vane belonging to a stator segment, wherein the cavity is circumferentially defined within the stator segment.

11. The turbine module according to claim 10, wherein the cavity is circumferentially defined between two neighboring stator airfoils.

12. The turbine module according to claim 10, wherein the stator segment comprises a circumferentially offset further cavity, which has a further inlet opening and a further outlet opening, wherein the cavities are, apart from their respective communication with the main channel, fluidically isolated from each other.

13. The turbine module according to claim 1, further comprising:

a rotor blade upstream of the stator vane;

wherein the part of the main flow guided into the cavity is a leakage flow of the rotor blade.

14. A turbomachine with a turbine module according to claim 1.

15. Using a turbomachine according to claim 14, wherein a part of the main flow is guided into the cavity and reinjected from the cavity into the main channel.

16. A turbine module for a turbomachine, the turbine module comprising:

a main channel to guide a main flow through the turbine module;

a stator vane comprising a stator airfoil and an outer platform;

a cavity extending at least partly radially outside of the stator airfoil;

the cavity comprising an inlet opening for guiding a part of the main flow into the cavity and an outlet for a reinjection of the part of the main flow from the cavity (30) into the main channel;

wherein the cavity comprises a number n of inlet openings, where $n \geq 2$, and a number m of outlet openings, where $m \geq 1$, wherein circumferentially adjacent inlet openings are separated by ribs;

wherein an inner wall of the outer platform defines the main channel radially, and wherein the inlet opening is arranged on a radial position radially outside of the inner wall surface of the outer platform.

17. A turbine module for a turbomachine, the turbine module comprising:

a main channel to guide a main flow through the turbine module;

a stator vane comprising a stator airfoil and an outer platform;

a rotor blade downstream of the stator vane;

a cavity extending at least partly radially outside of the stator airfoil;

the cavity comprising an inlet opening for guiding a part of the main flow into the cavity and an outlet for a reinjection of the part of the main flow from the cavity (30) into the main channel, wherein an inner wall of the outer platform defines the main channel radially, and wherein the inlet opening is arranged on a radial position radially outside of the inner wall surface of the outer platform, wherein at least one outlet opening of the cavity is arranged in an outer air seal cavity of the rotor blade downstream of the stator vane.

18. A turbine module for a turbomachine, the turbine module comprising:

a main channel to guide a main flow through the turbine module;

a stator vane comprising a stator airfoil and an outer platform;

a cavity extending at least partly radially outside of the stator airfoil;

wherein the cavity is circumferentially defined between two neighboring stator airfoils, the stator vane belonging to a stator segment, wherein the cavity is circumferentially defined within the stator segment;

the cavity comprising an inlet opening for guiding a part of the main flow into the cavity and an outlet for a reinjection of the part of the main flow from the cavity (30) into the main channel;

wherein an inner wall of the outer platform defines the main channel radially, and wherein the inlet opening is arranged on a radial position radially outside of the inner wall surface of the outer platform.

19. A turbine module for a turbomachine, the turbine module comprising:

a main channel to guide a main flow through the turbine module;

a stator vane comprising a stator airfoil and an outer platform;

a cavity extending at least partly radially outside of the stator airfoil;

the stator vane belonging to a stator segment, wherein the cavity is circumferentially defined within the stator segment; the stator segment comprises a circumferentially offset further cavity, which has a further inlet opening and a further outlet opening, wherein the cavities are, apart from their respective communication with the main channel, fluidically isolated from each other;

the cavity comprising an inlet opening for guiding a part of the main flow into the cavity and an outlet for a reinjection of the part of the main flow from the cavity (30) into the main channel;

wherein an inner wall of the outer platform defines the main channel radially, and wherein the inlet opening is arranged on a radial position radially outside of the inner wall surface of the outer platform.

* * * * *